United States Patent [19]

Kunz

[11] Patent Number: 4,627,505

[45] Date of Patent: Dec. 9, 1986

[54] WEIGHING APPARATUS AND METHOD FOR AUTOMATICALLY MONITORING A CONSTANT CURRENT SOURCE

[75] Inventor: Peter Kunz, Gossau, Switzerland

[73] Assignee: Mettler Instrumente AG, Greifensee, Switzerland

[21] Appl. No.: 743,905

[22] Filed: Jun. 12, 1985

[30] Foreign Application Priority Data

Jun. 29, 1984 [CH] Switzerland .................. 3140/84

[51] Int. Cl.$^4$ ..................... G01G 7/00; G01L 1/08
[52] U.S. Cl. ................................. 177/1; 177/212; 73/862.61
[58] Field of Search ............. 177/1, 210 FP, 212; 73/862.61

[56] References Cited

U.S. PATENT DOCUMENTS

| | | | |
|---|---|---|---|
| 3,786,883 | 1/1974 | Kunz | 177/212 X |
| 3,786,884 | 1/1974 | Allenspach | 177/212 X |
| 4,170,269 | 10/1979 | Kunz | 177/212 X |
| 4,189,017 | 2/1980 | Strobel et al. | 177/212 |
| 4,245,711 | 1/1981 | Kunz | 177/212 |
| 4,248,316 | 2/1981 | Strobel et al. | 177/210 FP |
| 4,457,386 | 7/1984 | Schett et al. | 177/212 |
| 4,549,623 | 10/1985 | Baumann | 177/212 |

FOREIGN PATENT DOCUMENTS 2803682 8/1979 Fed. Rep. of Germany .
3200872 7/1983 Fed. Rep. of Germany .
3213016 10/1983 Fed. Rep. of Germany .

Primary Examiner—George H. Miller, Jr.
Attorney, Agent, or Firm—Laubscher & Laubscher

[57] ABSTRACT

Weighing apparatus of the load compensation type including a position sensing circuit for supplying current pulses from a constant current source to a compensation coil to return the load platform—after the application of a load thereto—toward its initial no-load position relative to the frame, the magnitude of the compensation current, as displayed by digital readout means, being a function of the mass of the applied load, characterized by the provision of an auxiliary analog-to-digital converter for digitalizing a signal corresponding with the compensation current, and a comparison circuit for comparing the digitalized signal with a standard value and for generating an error signal if the comparison result exceeds a given value. In addition to monitoring the constant current source, other components (such as temperature sensor, current switch and compensation coil) may be monitored by corresponding comparisons.

6 Claims, 4 Drawing Figures

WEIGHING APPARATUS AND METHOD FOR AUTOMATICALLY MONITORING A CONSTANT CURRENT SOURCE

BRIEF DESCRIPTION OF THE PRIOR ART

Electromagnetic load compensation weighing systems are well known in the patented prior art, as evidenced, for example, by the prior patents to Kunz U.S. Pat. Nos. 3,786,883, 4,170,269, and 4,245,711, Baumann U.S. Pat. No. 4,549,623, Allenspach U.S. Pat. No. 3,786,844, Strobel et al U.S. Pat. Nos. 4,189,017 and 4,248,316 and Schett et al U.S. Pat. No. 4,457,386, each assigned to the same assignee as the instant invention. In these known systems, current pulses from a constant current source are supplied to a compensation coil connected with the movable load support member, thereby to return the same toward an initial no-load position. The lengths of the compensation current pulses are measured in terms of counting pulses by an analyzing circuit that produces a digitalized signal that is a function of the magnitude of the applied load and which may be displayed by a digital display.

In modern electrical scales, the reliability of the measuring process and illustration of the measurement value is an important consideration. Because in many cases an inappropriate weight reading cannot be recognized as being inherently in error, especially when this involves minor deviations from the actual value, greater emphasis is being placed on measures aimed at functional error recognition (hereafter referred to as FER). For example, various methods for FER have already become known in connection with digital indicators because the undetected failure of individual indicating elements can have a particularly serious effect.

In spite of improved reliability, however, other components (such as current sources and the like), which are used in obtaining and processing measurement values, are also error-prone, especially owing to the phenomenon of aging. The present invention arose from the problem of effectively continuously monitoring the essential components of the weighing apparatus with a moderate expenditure in terms of FER.

SUMMARY OF THE INVENTION

Accordingly, a primary object of the present invention is to monitor the constant current source of a weighing system of the load compensation type by means of an FER circuit in such a manner that the constant current is periodically digitalized in an A/D converter which is separate from the weight-indicating digitalization means, the digitalized constant current value being compared in the analyzing circuit with a predetermined value, whereby the analyzing circuit generates an error signal if the difference between both compared values exceeds a predetermined amount. In this way, it can be assured that changes in the performance of a particularly critical element, specifically, the constant current source, will not produce any undetected errors. At the same time, the proper operation of the A/D converter is checked as well.

At least weighing systems with higher requirements in terms of performance have temperature sensors which compensate for the influence of the temperature. According to a further aspect of the invention—where additional digitalized signals from a highly linear temperature-responsive current source are combined in the analysis circuit with the weight values to supply a temperature-corrected indication—the signals of a second temperature-responsive current source are intermittently digitalized and are compared in the analysis circuit with the digitalized signals from the first temperature-current source, whereby the analysis circuit generates an error signal if the difference between both compared values exceeds a predetermined amount. In this way, the danger of undetected functional errors from the temperature correction means is eliminated.

In keeping with the aforementioned inventive concepts, the weighing apparatus and method are characterized by the use of an FER circuit for the surveillance of the constant current source, whereby the FER circuit comprises an A/D converter that is independent of the weight value digitalization for the periodic digitalization of the constant current, as well as a circuit for the comparison of the digitalized value of the constant current with a predetermined value.

In a preferred version, there is provided, for the correction of temperature fluctuations, a temperature-responsive current source that generates a linear temperature-responsive current, and a circuit for the digitalization of this current and the analysis circuit is designed for combining the digitalized signal with the weight value, whereby there is provided a second temperature-current source which is identical to the first one and which can be connected to the above-mentioned digitalization circuit, and where the analyzing circuit is furthermore designed for the comparison of both digitalized values. Here the above-mentioned digitalization circuit may comprise the A/D converter that is independent of the weight value digitalization.

In another advantageous version, there is furthermore provided a resistor which is associated with the compensation coil, connected between the coil and the ground, which resistor, in combination with the FER circuit, brings about the surveillance of the current switch and the compensation coil. This means that additional structural components are included in the monitoring produced by the FER.

BRIEF DESCRIPTION OF THE DRAWING

Other objects and advantages of the invention will become apparent from a study of the following specification when viewed in the light of the accompanying drawing, in which.

DETAILED DESCRIPTION

Figure 1A:
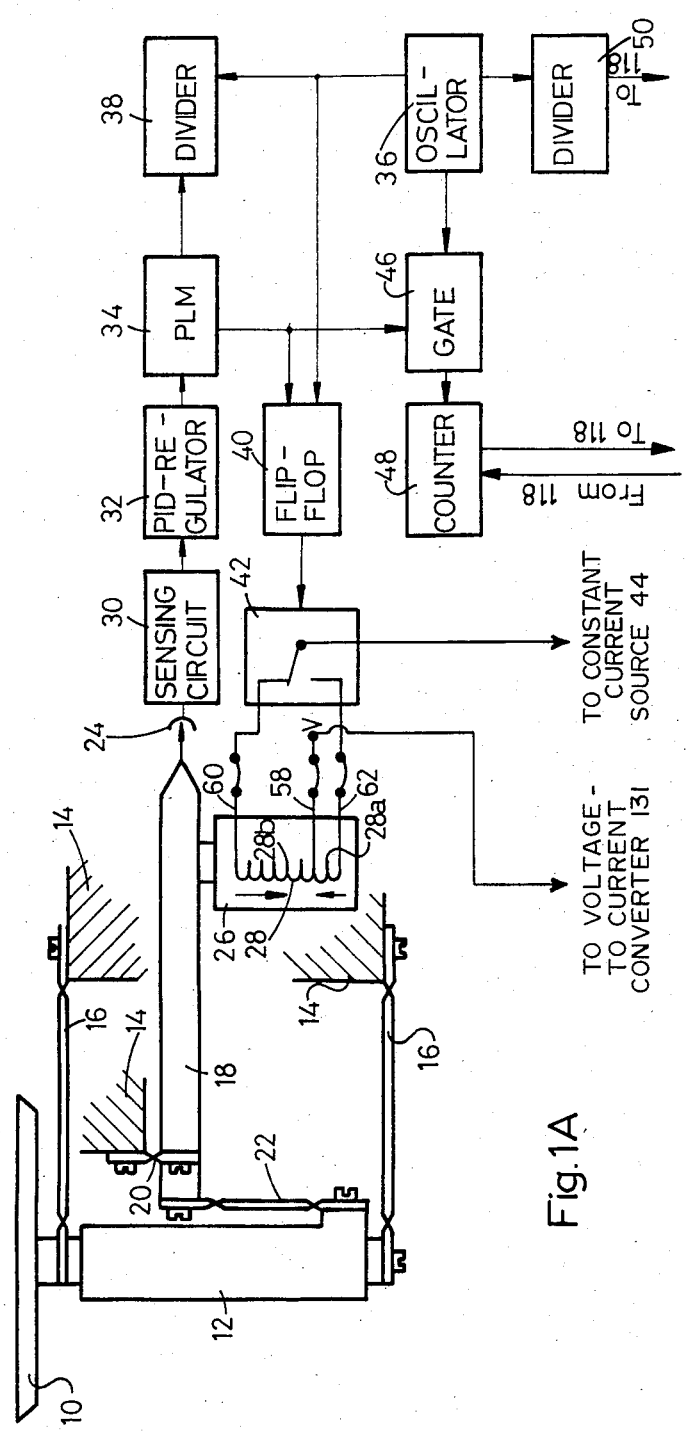
FIGS. 1A and 1B illustrate an electrical schematic block diagram of the error recognition system of the present invention, as applied to a weighing apparatus of the electromagnetic load compensation type disclosed in the Kunz U.S. Pat. No. 4,245,711.

Referring first more particularly to FIG. 1, the error recognition system of the present invention is illustrated in connection with the weighing apparatus of the prior Kunz U.S. Pat. No. 4,245,711, wherein a weighing pan 10 supported by the vertical support 12 is guided for vertical movement relative to the stationary frame 14 by the parallel resilient horizontal guide members 16. Horizontal lever 18 is pivotally connected intermediate its ends with the frame by flexure pivot means 20, and the left hand of the lever is pivotally connected with the load support 12 via flexure member 22. Connected with the other end of the lever is a coil carrier 26 that carries the compensation coil 28 arranged within a stationary magnet field produced by permanent magnet means (not shown) connected with the frame.

Position sensing means 30 including an optical sensor 24 are mounted on the frame for determining the displacement of the weighing pan 10 and the vertical support from the illustrated no-load position and for supplying a corresponding position-responsive input to the PID regulator 32. As is conventional in the art, the pulse length modulator 34—which is supplied with a sawtooth waveform from oscillator 36 via divider 38—is responsive to the magnitude of the output of PID regulator 32 for supplying to the inputs of flip-flop 40 and gate 46 a series of pulses the lengths of which are a function of the extent of displacement of the pan support 12 from its normal no-load position. The flip-flop 40 controls the switching condition of switch means 42 and, consequently, the states of energization of the coil portions 28a and 28b. The pulse modulated signal from PLM 34 further controls the operation of gate 46 through which the high frequency oscillator signals are supplied to counter 48, whereby the number of pulses counted by the counter 48 corresponds with the lengths of the pulses from PLM 34 and the magnitude of the regulated position sensing signal. A reduced frequency signal supplied from oscillator 36 via divider 50 causes microcomputer 118 to periodically receive the count from counter 48 and to display the measurement result on digital display means 120.

As disclosed in greater detail in the prior Kunz U.S. Pat. No. 4,245,711, the coil portions 28a and 28b are alternately energized via the switch 42 to alternately apply to load support 12 different forces developed by the coil portions, respectively. The magnitude and direction of each of the applied forces depends, for example, on the position of the tap and on the lengths of the periods of energization of the coil portions, respectively. The forces produced by the coil portions may cooperate either with or against the force developed by the load being weighed.

In accordance with the present invention, a signal corresponding with the current supplied by the constant current source 44—which includes a voltage reference diode $D_{Ref\,I}$, for example, of the LM 385 NS type—is supplied to an A/D converter 128 via shunt resistor 130 and voltage-to-current converter 131 and a three-bank switch 126 controlled by microprocessor 118 for selectively connecting the currents from temperature-responsive current sources $T_1$ and $T_2$ and from the constant current source ($I_c$) with the input of analog-to-digital convertor 128. The temperature-responsive current sources are of the LM 334 NS type operable to generate linear temperature-responsive currents. This A/D converter is of the well-known type including a sawtooth waveform having an integrator (for example, a capacitor C) and a comparator 130 for comparing the output from the integrator with a reference voltage $V_{Ref\,II}$. The output of the A/D converter is supplied to a counter circuit 132 contained in the microprocessor.

Figure 2:
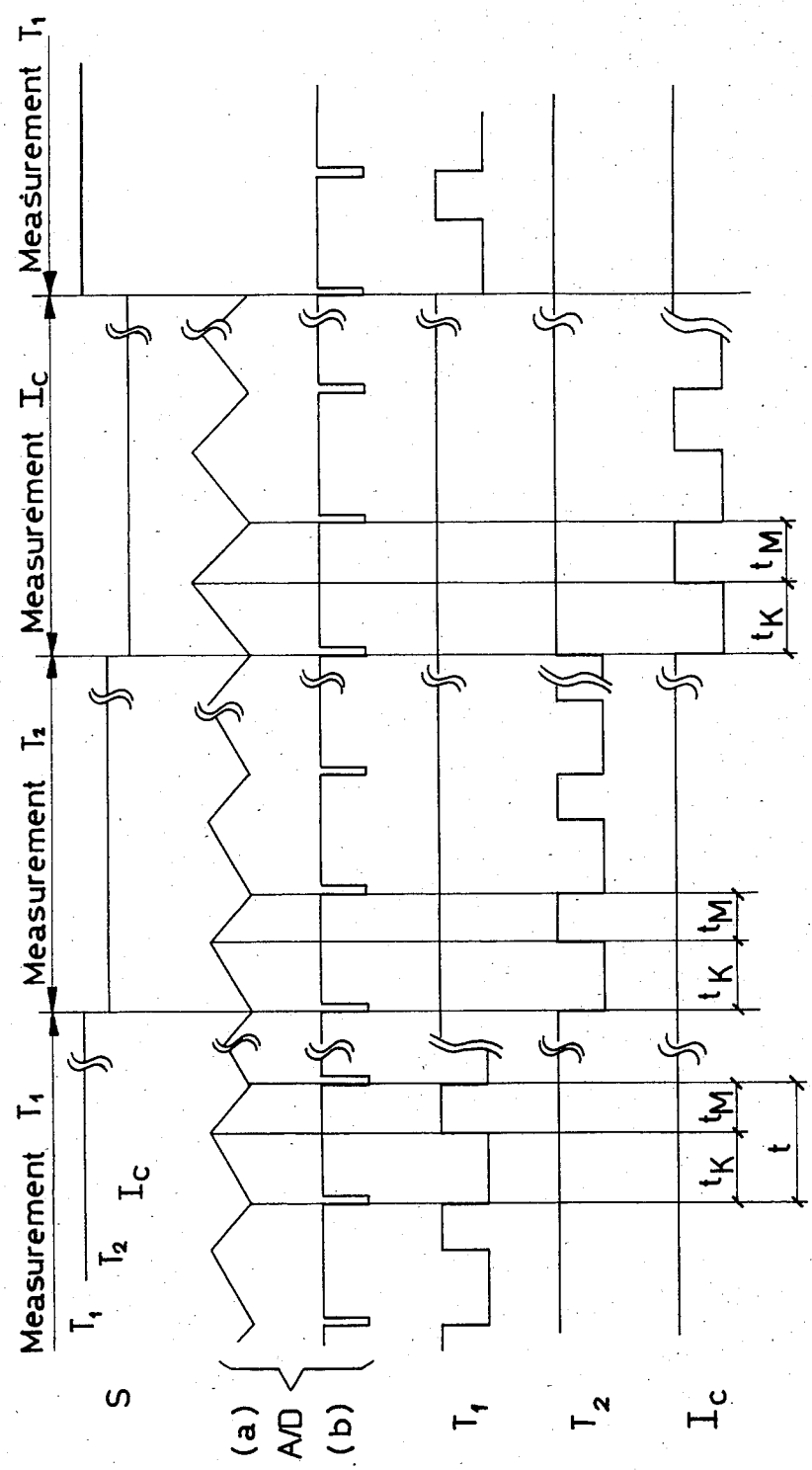
FIG. 2 is a waveform diagram illustrating the operation of the apparatus of FIG. 1.

Referring now to the waveform diagram of FIG. 2, the curve S represents the positions relative to time of the switch 126, wherein during the times $T_1$, $T_2$, and $I_c$, the sources $T_1$, $T_2$ and the constant current source, respectively, are connected with the A/D converter 128.

The A/D curves a and b represent the charging and discharging cycles of the integrating capacitor C and the operation of the comparator 130, respectively. In a known manner, during a constant time interval $t_k$ (for example, 107 ms), the particular input signal is integrated by the charging of the capacitor, whereupon the input to the comparator is switched to the known reference value $V_{Ref\,II}$. The capacitor is discharged and the corresponding time $t_m$ is determined by the count pulses (the number of which is proportional to the input signal).

In the illustrated embodiment, the count pulses are counted in the microprocessor, with 16 individual meausurement cycles t from $T_1$ or $T_2$ or $I_c$ being combined in one measurement result for further processing. This further processing includes a comparison by comparator 138 of the measurement result of $I_c$ with a standard value 134 that is stored in the microprocessor, which standard value was determined during an initial adjustment of the weighing apparatus at the factory. If the comparison result does not correspond with the standard value within a given degree of tolerance, an error signal is generated for activating an error indicator. The values from the temperature-responsive current sources $T_1$ and $T_2$ are compared for coincidence within a certain tolerance.

During the measuring times $T_1$, $T_2$ and Ic, simultaneously with the interruption of the particular input signal in the A/D converter 128 and the connection with the reference value $V_{Ref\,II}$, the counting means 132 in the microcomputer 118 begins to count pulses until the measurement interval $t_M$ has been completed.

Figure 3:
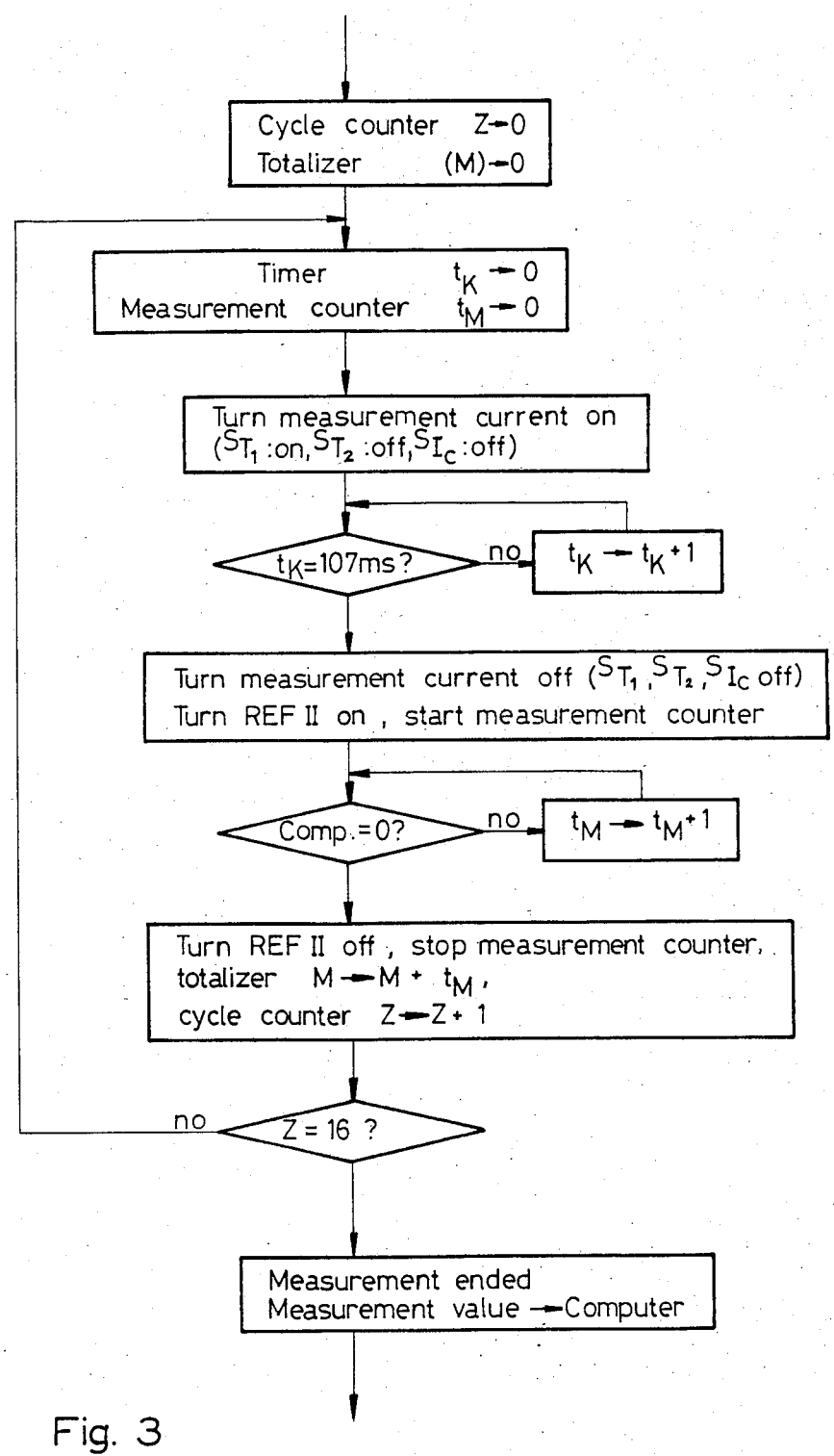
FIG. 3 is a flow diagram illustrating the error recognition operation of the present invention.

Referring now to the flow diagram of FIG. 3, initially the cycle counter Z and the totalizer M (counter 132 in FIG. 1) are set to zero, as are also the timer for time $t_k$, and the measurement counter 132 for time $t_M$. As controlled by the microcomputer 118, the particular current to be measured (i.e., the current $T_1$ of source 122) is supplied via switch 126. If the predetermined measurement time $t_k$ (i.e., 107 ms) has expired, then the measurement current is turned off, the reference current $V_{Ref\,II}$ is turned on and the measurement counter 132 is started. During time $t_M$, the counter 132 counts the time pulses until the comparator output of the A/D converter 128 indicates passage through zero. The reference current is then turned off, the measurement counter 132 is stopped, and its result is transferred over to the totalizer 136. The cycle counter Z is then switched forth and the cycle begins anew until 16 cycles have been completed. Then the cumulative measurement value M from the 16 individual $t_M$ counts is passed on to the calculator 136 for further processing. During the subsequent measurement, the current level $T_2$ of the temperature-responsive current source 124 is monitored, whereupon the process is repeated for the constant current source $I_c$. The flow diagram in each case is the same as in FIG. 3; only during step 3 are the positions of switch 126 changed.

In the instant case, each time (after about 2 seconds) that a new measurement value is obtained (of $T_1$ or $T_2$ or $I_c$), the control calculations are periodically supplied (approximately every 7 seconds) as a new result for the temperature sensors 122 and 124 and for the constant current source 110.

By this procedure even the strict requirements for the function error recognition (FER) have been met, and constant monitoring has been provided. If an error occurs during one of the control calculations, then an error signal is produced. For this purpose, various known indicating methods are possible, as, for example, optical read-out means (in the form of a flashing light, or the replacement of the numeral data by a word, such as "ERROR"), or an acoustical signal (such as an audible alarm).

Independently of the function error recognition system disclosed above, the digitalized temperature signal from one of the two temperature-responsive current sources 122 or 124 is used in a known manner to correct the weight signal, in that the latter is calculated with the former according to a corresponding formula in order to compensate for the effect of temperature fluctuations on the weight result.

For the sake of completeness, it should be mentioned that, by the use of the FER method discussed above, the operation of the A/D converter is also monitored, as well.

Figure 1B:
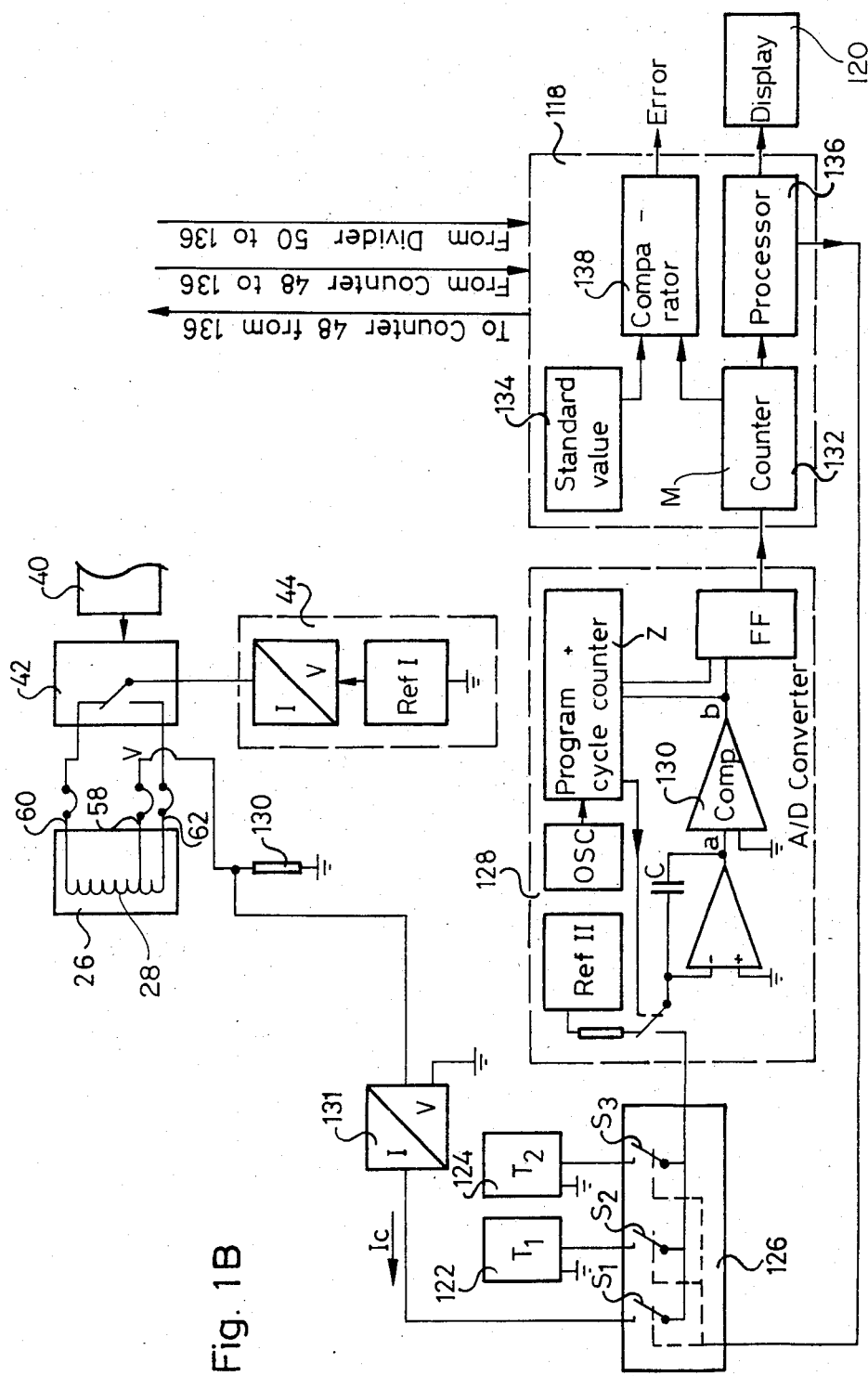

According to another feature of the invention, the resistor 130 (via voltage-to-current converter 131) of FIG. 1—which changes the constant current $I_c$ as soon as a leakage current occurs in voltage-to-current converter 44 or in switch 42 or a short circuit appears in coil 28 (as is possible when metallic coil carriers are used)—affords means for monitoring the aforementioned components.

Several variations are also possible within the scope of the present invention. Of course, the specific choice of the duration of the time intervals $t_K$ and the number of measurement cycles per measurement can be varied within a broad range, depending upon the particular situation. Thus, different numbers of measuring cycles can be assigned to the individual signals; furthermore, when necessary, individual controls can be performed more frequently than others (for example, by checking on $I_c$ at intervals longer than those of $T_1$ and $T_2$).

The use of the invention is not confined to weighing apparatus of the type described above, but it might also be used in connection with other types of weighing systems with pulse compensation (as disclosed, for example, in the Allenspach U.S. Pat. No. 3,786,884).

The present invention offers the advantage that, among other things, the need for an auxiliary testing weight—as is often required by the calibration authorities for the functional testing of the scale—is eliminated, and the installation of an FER circuit according to the present invention is considerably simpler and cheaper than the installation of a testing weight. Moreover, the aforementioned FER circuit can also be used in the case of weighing apparatus with a lower power supply voltage and a small power consumption (for example, in battery-operated scales), provided the components are selected accordingly.

In the described embodiment, the constant current $I_c$ is supplied to switch 126 in unchanged magnitude via voltage-to-current converter 131. By corresponding dimensioning of the operational amplifier, a reduction in the current is possible (whereby the reduction factor must remain constant), for example, to a figure of 1/10 of the original value. By using only a reduced size image of the constant current for the test, one can keep the load on switch 126 and on the A/D converter 28 correspondingly small.

What is claimed is:

1. In a weighing apparatus for the load-compensation type including a frame; load support means connected for movement from a normal no-load position relative to said frame; load compensation means including a compensation coil connected with said load support means, permanent magnet means connected with said frame adjacent said compensation coil, and position-responsive means operable upon the application of a load to the load support for periodically supplying compensation current pulses from a constant current source (44) to the compensation coil to displace the load support means towards its initial no-load position; and means for digitally processing and displaying the magnitude of the applied load as a function of the compensation current supplied to the compensation coil;
   the improvement which comprises
   function error recognition means for generating an error signal when the current of said constant current source deviates a given extent from a standard value, including
   (a) means including analog-to-digital converter means (128) for producing a periodically digitized signal that is a function of the current supplied by said constant current source; and
   (b) means (118) including comparison means (138) for generating an error signal when the digitalized current differs by a given amount from a standard value.

2. Apparatus as defined in claim 1, and further including
   (c) first (122) and second (124) temperature-responsive current sources; and
   (d) means (126) for selectively connecting said constant current source and said first and second temperature-responsive current sources with said digitalizing means, respectively.

3. Apparatus as defined in claim 1, wherein said analog-to-digital converter means is independent of said load compensation means.

4. Apparatus as defined in claim 1, and further including a resistor (130) connected in series with said compensation coil, said function error recognition means being connected with said resistor to monitor the magnitude of the current supplied by said constant current source.

5. The method for monitoring the operation of a weighing apparatus of the load compensation type including a frame; load support means connected for movement from a normal no-load position relative to said frame; load compensation means including a compensation coil connected with said load support means, permanent magnet means connected with said frame adjacent said compensation coil, and position-responsive means operable upon the application of a load to the load support for periodically supplying compensation current pulses from a constant current source (44) to the compensation coil to displace the load support means toward its initial no-load position; and means for digitally processing and displaying the magnitude of the applied load as a function of the compensation current supplied to the compensation coil;
   which method includes the steps of
   (a) periodically digitalizing by means of an analog-to-digital converter (128) separate from said load compensation means a signal that is a function of the current supplied by the constant current source;
   (b) comparing (138) the digitalized current signal with a predetermined value (134); and
   (c) generating an error signal if the deviation between the digitalized current and the predetermined value exceeds a given amount.

6. The method defined in claim 5, wherein the weighing apparatus is of the type including a temperature-responsive current generating device (122) arranged for generating a temperature-responsive signal that is used to modify the weight-responsive signal, and further including the steps of (d) intermittently digitalizing the signals of a second temperature-responsive current source (124);
(e) comparing the digitalized signals of said first and second temperature-responsive signals; and
(f) generating an error signal if the deviation between the digitalized signals of the two temperature-responsive sources exceeds a given amount.

\* \* \* \* \*